Figure 1:
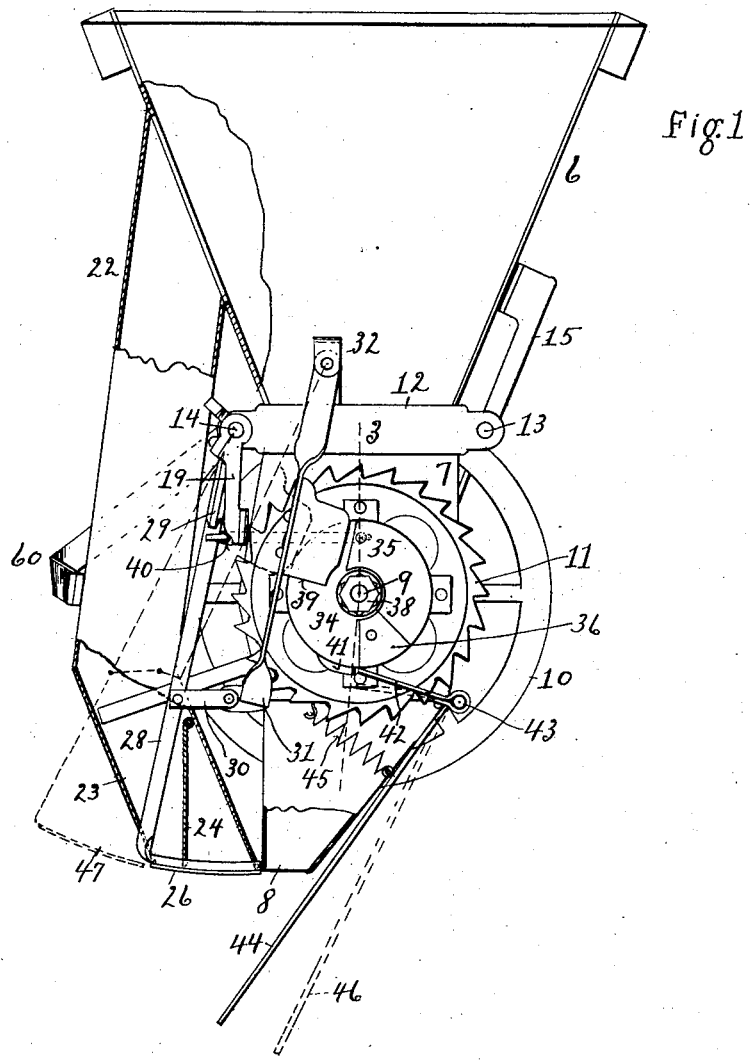

C. D. SCOTT.
FEEDER FOR AUTOMATIC WEIGHING MACHINES.
APPLICATION FILED JAN. 10, 1912.

1,060,792.

Patented May 6, 1913.
2 SHEETS—SHEET 1.

Witnesses

Inventor
Charles D. Scott

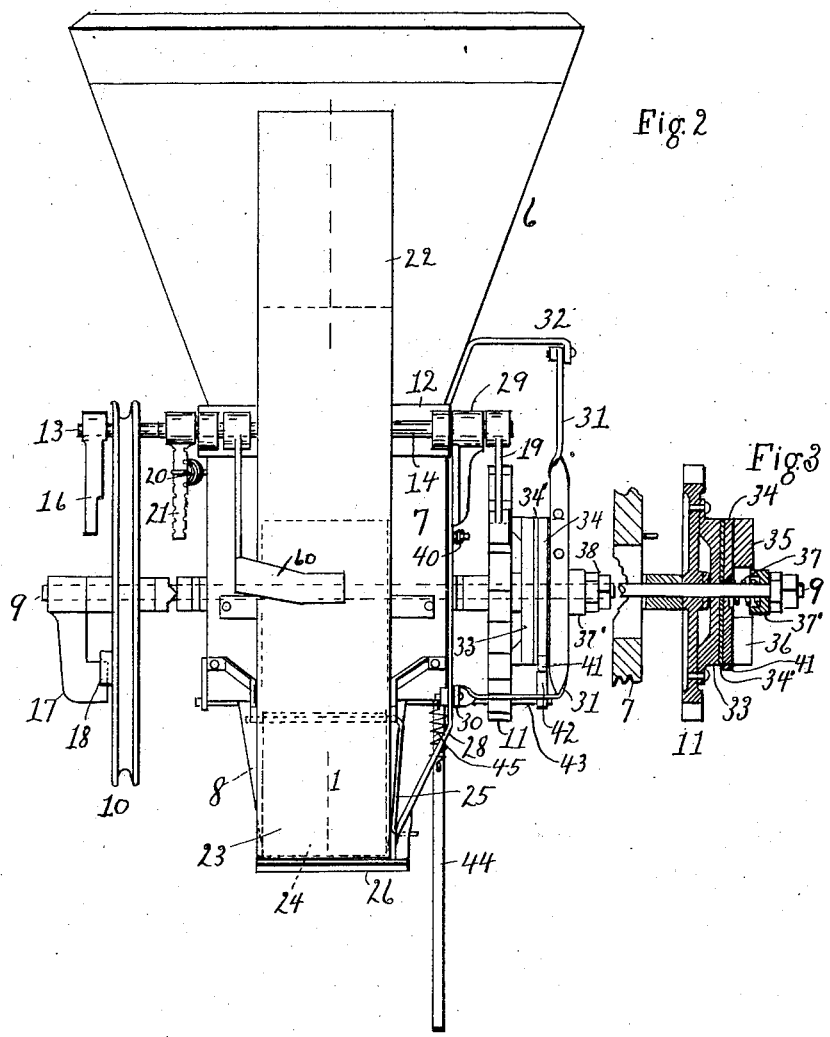

UNITED STATES PATENT OFFICE.

CHARLES D. SCOTT, OF TOPEKA, KANSAS, ASSIGNOR TO PERCY E. GINN, OF WINCHESTER, MASSACHUSETTS.

FEEDER FOR AUTOMATIC WEIGHING-MACHINES.

1,060,792. Specification of Letters Patent. Patented May 6, 1913.

Application filed January 10, 1912. Serial No. 670,458.

*To all whom it may concern:*

Be it known that I, CHARLES D. SCOTT, a citizen of the United States, residing at Topeka, in the county of Shawnee and State of Kansas, have invented certain new and useful Improvements in Feeders for Automatic Weighing-Machines, of which the following is a specification.

In an application Serial No. 644,300 filed by me, I have shown and described a feeding device to be used in connection with weighing machines, said feeding device comprising a hopper with mechanism adapted to feed through the lower end of the hopper a steady and constant stream of the commodity. The object in having the steady stream is chiefly so that when the desired weight is attained in the weighing container, the stream cut off by the shutter will be always the same, thus preventing variations in the final amount of commodity in the container which would result were the stream irregular.

It is the object of my present invention to provide an auxiliary feeder to be used in connection with a constant feeder, such for instance as is shown in my said former application, and which is adapted to discharge into the weighing container a large quantity of the commodity somewhat less in amount than the desired final weight, letting the final weight be attained by the discharge from the constant feeder. By combining this auxiliary feeder with the constant feeder, the weighing can be accomplished much more rapidly than when depending alone on the constant feeder; yet the final weight will always be just as accurate as if the entire discharge were from the constant feeder.

My invention comprises the combination with a constant feeder of an auxiliary feeder adapted to discharge a large quantity of the commodity, a shutter for the auxiliary feeder, and a mechanism operated by the constant feeder for operating and controlling the auxiliary feeder; and it also comprises the parts, improvements, and combinations hereinafter set forth and claimed.

In the drawings accompanying and forming part of this specification and in the description of the drawings, I have shown my invention in its preferred form and what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 1 is a side elevation of a feeder made in accordance with the principles of my invention, certain parts being shown in section as indicated by the line 1 in Fig. 2 which is a front elevation. Fig. 3 is a sectional elevation, on a plane indicated by the line 3 in Fig. 1 of the parts operatively connecting the constant feeder mechanism with the auxiliary feeder shutter.

Similar reference characters indicate like or corresponding parts throughout the several views.

6 is a hopper provided with a casing 7 and a discharge end 8. The casing 7 may contain any suitable mechanism for producing a constant and regular discharge of the commodity from the hopper through the discharge end 8, such for instance as shown in my previous application. This mechanism may be operated by a shaft 9, turned by a drive wheel 10 through the lug 18 and arm 17. 11 is a ratchet wheel secured on the shaft 9. 12 is a casting forming bearings for the rods 13 at the back and 14 at the front. 15 is a tapper secured on rod 13 and adapted by the operation of the drive wheel and the arm 16 to vibrate the wall of the hopper in order to prevent the commodity from sticking in the hopper. 19 is an arm secured to rod 14 and bearing against the ratchet wheel and adapted in connection with the arm 21 and spring 20 to give said rod an oscillating motion. So much of my mechanism is not new so far as this application is concerned, it being claimed in my said former application.

22 is a chute leading from the hopper above the casing down and terminating adjacent to the discharge end 8, the lower end being turned inwardly, as shown at 23.

24 is a regulator hinged on a rod 25 which is bent downwardly on the outside so as to bear resiliently against the outer wall of the chute, whereby the regulator, or closure, or door, may be oscillated to increase or diminish the exit opening from the chute.

26 is a shutter adapted to close the lower end of the chute. It is suspended on an arm 28 which is secured to a bracket 29 working freely on the rod 14. It is connected, by link 30 with a lever 31, which is pivoted to a bracket 32.

Secured to the ratchet wheel is a friction disk 33, against which works another friction disk 34, and, if desired, another disk 34' may be placed between the two for wearing purposes. These latter two disks are mounted loosely on the shaft.

35 is a segmental block secured to the last-named disk, and 36 is an additional block removably secured thereto. 37 is a compression spring bearing between said last-mentioned disk and a recessed collar 37' which is held in place by means of the nuts 38, the purpose of the spring being to press the disks together so as to make a friction clutch.

39 is a block or arm secured to the lever 31 and standing in the path of the segments.

Normally the parts are held with the shutter in closed position by the spring 40 and by reason of the engagement against the lug 41 of the arm or pawl 42 mounted on rod 43 on which is also secured a long rod 44, even though the shaft be in motion. If, now, the rod 44 is moved to the position indicated by 46 against the tension of the spring 45, the segment will push the block or arm 39 and all parts to and including the shutter to the positions indicated by the dotted lines, especially 47, the shutter being thus open. The parts will be retained in this position until the shaft has made a partial rotation, that is, until the arm 39 is free from the segment, and then the springs 45 and 40 will pull the parts back to normal position with the shutter closed. It will be thus seen that the auxiliary feeding is accomplished by a time element, regulated by the length of the segment, and the speed of the rotation of the shaft. To make a less feed, the block 36 may be removed. Also the auxiliary feeding may be regulated by adjusting the wing 24.

In using my present invention in an automatic weighing machine, I contemplate the provision of an automatic tripping device for the arm 44, so that while the constant feeder is discharging all the time, the auxiliary feed discharges only intermittently. In further explanation, when the scale breaks, that is, balances, and discharges its weighed commodity, the arm 44 is tripped opening the shutter 26; a large quantity of commodity is then discharged into the weighing container (the auxiliary feeder being so adjusted that this quantity is less than the final weight desired), and the shutter is closed; then, and meanwhile, the constant feeder is discharging a steady and mechanically regular stream into the container and continues to do so until the exact desired weight is attained, when the weighing mechanism discharges the weighed commodity and again trips the arm 44. This operation may be continuous so far as the main feeder is concerned, and is intermittent as to the auxiliary feeder. It will be thus seen that while the main feeder is constant and its discharge relatively slow, the auxiliary feeder may have a large and quick discharge; thus affording both rapid and accurate automatic weighing.

The arm 60 is a tapper secured to the rod 14 for vibrating the wall of the chute 22 to prevent clogging and sticking.

What I claim is:

1. The combination with a hopper having a casing and a discharge end and a mechanism within the casing for producing a constant and regular feed from the hopper through the discharge end, said mechanism including a rotating shaft; of an auxiliary chute leading from the hopper around the casing and down and terminating adjacent to the discharge end of the hopper; a regulating wing within said chute; a shutter for said chute, an arm to which the shutter is secured; a lever; a link connecting the arm and lever; a friction disk secured on the shaft, and another friction disk mounted loosely on the shaft; a spring for pressing said disks together, a segment secured to the loosely mounted disk; a spring for holding said shutter, arm, link, and lever with the shutter in closed position, and said segment being adapted on rotation to open the shutter; a lug on the loosely mounted disk; a pawl engaging said lug to hold said loosely mounted member at rest; and a rod for tripping said pawl and freeing it from the lug.

2. The combination with a hopper having a casing and a discharge end and a mechanism within the casing for producing a constant and regular feed from the hopper through the discharge end, said mechanism including a rotating shaft; of an auxiliary chute leading from the hopper to said discharge end; a regulating wing in said chute; a shutter for the chute; a pivoted arm to which the shutter is secured; a spring for normally closing the shutter; a friction clutch, one member of which is secured on the shaft and the other member of which is mounted loosely on the shaft; a segment secured to the loosely mounted member; a stop for said loosely mounted member; a trip for disengaging said stop; a spring for holding the stop and trip in normal position stopping the loosely mounted member; and an element between the shutter and the segment whereby said segment operates the shutter to open it in opposition to the first-named spring.

3. The combination with a hopper having a casing and a discharge end and a mechanism within the casing for producing a constant and regular feed from the hopper through the discharge end, said mechanism including a rotating shaft; of an auxiliary chute leading from the hopper to the discharge end; a shutter for the chute; a spring for holding the shutter normally closed; a friction clutch, one member of which is secured to said shaft, the other member of which is loosely mounted thereon; a segment coöperating with the loosely mounted member and a stop therefor; devices for operating the stop; and devices between the segment and the shutter whereby the segment operates the shutter in opposition to the spring.

4. The combination with a hopper having a constant and regular feed and including a shaft; of an auxiliary chute leading from the hopper above said mechanism to the exit end of the hopper below said mechanism; a shutter for said chute; a friction clutch mounted on the shaft comprising a rigidly mounted and a loosely mounted member; a stop for stopping and releasing the loosely mounted member; and mechanism between the shutter and the loosely mounted member whereby said shutter is operated by said loosely mounted member.

5. The combination with a hopper having a constant and regular feed and including a shaft; of an auxiliary chute leading to the exit end of the hopper below said mechanism; a shutter for said chute; a friction clutch mounted on the shaft comprising a rigidly mounted and a loosely mounted member; a stop for stopping and releasing the loosely mounted member; and mechanism between the shutter and the loosely mounted member whereby said shutter is operated by said loosely mounted member.

6. The combination with a hopper having a constant and regular feed and driving mechanism therefor; of an auxiliary chute; a shutter for said chute; a second mechanism connected with said driving mechanism for opening and keeping open said shutter; a spring for closing the shutter and devices capable of bringing said second mechanism into operative engagement with and operatively disengaging it from said first-named mechanism.

7. The combination with a hopper having a constant and regular feed and driving mechanism therefor; of an auxiliary chute; a shutter for said chute; a second mechanism between the driving mechanism and the shutter for opening and keeping open said shutter, said second mechanism being normally operatively disengaged from said driving mechanism; a spring for closing the shutter and a tripping device for operatively engaging said mechanisms together.

8. The combination with a hopper having a regular feeding mechanism and driving mechanism therefor; of an auxiliary chute and a shutter for said chute; and a mechanism between said driving mechanism and said chute for opening and keeping open said shutter; and means controlled by said last-named mechanism for closing the shutter.

9. The combination with a hopper having a regular feeding mechanism and driving mechanism therefor; of an auxiliary chute and a shutter therefor; and means for opening and closing said shutter including a time element controlled by said driving mechanism for determining the length of time said shutter remains open.

10. The combination with a hopper having a regular feeding mechanism and driving mechanism therefor; of an auxiliary chute and a shutter therefor; a mechanism connecting the driving mechanism with the shutter for opening and keeping open said shutter, and a spring for automatically closing said shutter, said connecting mechanism being normally operatively disengaged from said driving mechanism; a tripping device for causing the driving mechanism to engage operatively with said connecting mechanism; and a stop for automatically disengaging said driving mechanism from said connecting mechanism at the closing of said shutter.

In testimony whereof I have affixed my signature in presence of two witnesses.

CHARLES D. SCOTT.

Witnesses:
CHAS. P. WELLMAN,
J. M. STARK.